Oct. 3, 1933.   R. J. TEETOR   1,928,769
LOCK NUT
Filed Oct. 1, 1931
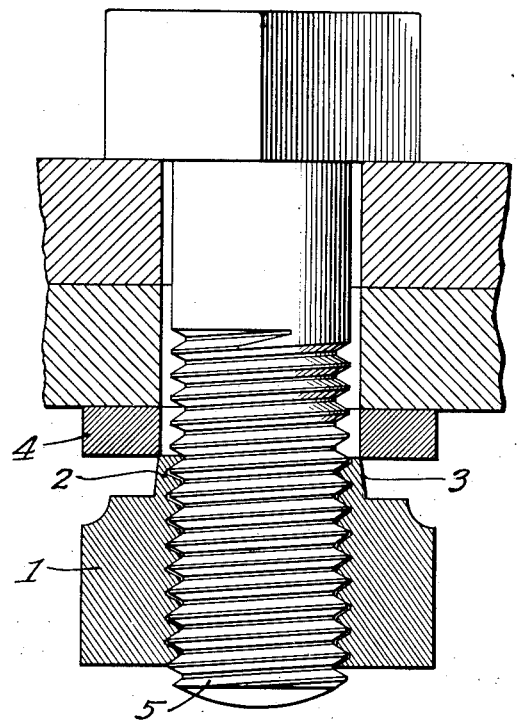
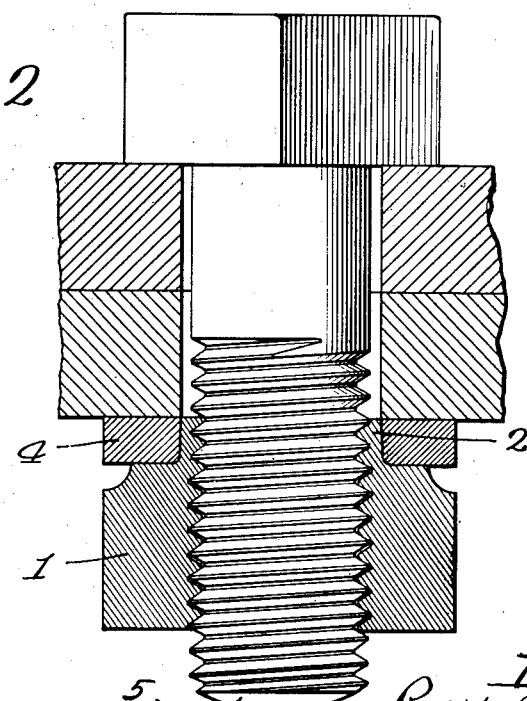
Inventor
Ralph J. Teetor
By Rector, Hibben, Davis Macauley Attys Patented Oct. 3, 1933

1,928,769

UNITED STATES PATENT OFFICE 1,928,769

LOCK NUT

Ralph J. Teetor, Cadillac, Mich.

Application October 1, 1931. Serial No. 566,241

3 Claims. (Cl. 151—19)

My present invention relates to lock nuts which are designed, when applied to a bolt and tightly turned up to engaged position in use, to offer resistance to a disengaging reverse movement of the nut in as great measure as possible, so that the nut will not loosen because of vibration, or from causes incidental to use and other than forcible, intentional removal, and which, even though the nut is not drawn up all the way home to produce the full intended bolt tension, will grip the engaged threads of the bolt tightly and strongly resist removal. It is the purpose and object of my invention to provide a lock nut of this character which may be readily and economically produced by casting in sand molds, and which when used in connection with a suitable washer member, by reason of the continuous and uncut formation of a tapered axial nipple formed upon one side of the nut, cooperating when the nut is tightened with the cylindrical inner face of such a washer, will result in a molecular flow of metal of such nipple, particularly in the region adjacent the base thereof, so as to bring about a locking engagement of the nut with the bolt superior in efficiency, simplicity, cheapness of construction and freedom from objectionable qualities to any other lock nuts known to me and having a neck or nipple portions engaging a washer member; as, for instance, the locking nut shown in Bong Patent, No. 1,149,329, in which the tapered bore of a washer member acts to contract the outer part of a cylindrical nipple portion of the nut, leaving the region adjacent the base relatively unaffected, or the locking nut shown in Paige Patent No. 254,685, in which radial cuts or openings in a divided neck portion of the nut permits separate bending of the sections of the neck and occasions a tendency to mutilation of the threads of the bolt. With the foregoing objects and requirements mentioned in view I have devised and invented the lock nut illustrated in the drawing and hereinafter described in detail, and my invention resides in the specific construction and form of the locking portion of the nut, and its coaction with an associated washer and bolt, as more particularly pointed out in the appended claims.

In the drawing, Figure 1 is an axial section of my novel lock nut applied to a bolt and in position to be tightened up into clamping engagement with interposed parts; and Fig. 2 is a similar section showing the parts tightened up.

The same reference characters are employed to designate like parts in both figures of the drawing.

One face of my novel lock nut 1,—which in transverse section may be square, hexagonal, or of other shape,—is formed with a narrow continuous nipple 2 extending between the threaded interior bore of the nut and a conical side face 3 which tapers somewhat from its base toward the axis of the nut, this particular shape incidentally lending itself to ready and economical production of nuts of malleable iron by casting them in sand molds. The diameter of the nipple across its outer face or edge is preferably very slightly larger than that of the cylindrical opening of the washer 4 with which it is designed to be used, the difference in dimensions being, say, from .008 to .012 of an inch within the ranges of the most generally used sizes of nuts. The outer edge of the nipple is slightly rounded and neither of the inner edges of the washer absolutely sharp, and in practice it is found that as the nut is tightened the parts will be centered and the nipple forced into the opening of the washer.

The washer employed is of ordinary form having a cylindrical opening, and its dimensions are such that it will have sufficient strength resisting radial expansion to cause the metal of the nipple to flow under it as the nut is being tightened, but preferably its strength and ductility are such that it will yield sufficiently to accommodate any slight surplus which may remain after the nipple has been compressed and squeezed into contact with the threads of the bolt as the face of the nut approaches and contacts with the face of the washer. Obviously, the greater the strength and hardiness of the metal of the washer, the less its width will be in order to attain the desired results.

The malleable iron of which the nut is formed is comparatively soft and ductile, it will be understood, having a Brinell hardness of from 100 to 140, as shown by the Symposium on malleable iron, of the American Society for Testing Materials, of June 26, 1931, while the bolt 5, with which it is designed to be employed is a steel bolt of the kind and hardness in common use, whether heat treated or not, which may have a Brinell hardness of from 150 to 200.

Inasmuch as the diameter of the nipple 2 across its outer face is initially but a trifle larger or approximately the same as the internal diameter of the washer, the compression of the nipple adjacent its outer face will be sufficient only to bring the metal of the nipple at that point into close contact with the threads of the bolt, and no further reduction or compression of the nipple at that point will take place. As the nut is turned upon the bolt and the nipple forced further into the orifice of the washer with a wedging engagement, the molecular disturbance or flow of material will occur increasingly from the face of the nipple toward its base, and not decreasingly in a direction toward the nut body, as in the case of prior locking nuts formed with nipples having a cylindrical face arranged to cooperate with a washer having a tapered bore. There is, therefore, but little tendency for the metal at the threaded edge of the outer face of the nipple to cut into or be worn down upon the bolt, while the portion of the nipple back of its outer face and adjacent its base will be strongly compressed, with the result that the threads of the nut affected by the compression will hug the threads of the bolts with a close and vigorous grip for a considerable distance, extending from the outer face of the nipple to a point adjacent its base, and will not be confined to that part only of the nipple adjacent its end. It may further be explained that the soft malleable nut can be intensely compressed on the thread of the harder steel bolt without danger of cutting or damaging the threads of either member, because the soft surface of the threads of the malleable nut will conform, under the intense pressure caused by forcing the nipple into engagement with the washer, to the exact contour of the threads of the harder steel bolt; whereas if both nut and bolt were made of hard steel the infinitesimal surface irregularities of the thread of the nut would interlock with similar surface irregularities of the thread of the bolt, and upon releasing or backing the nut off from the bolt these irregularities would have a tendency to cut and damage the threads of both parts, rendering them unfit for their purpose.

Since the nipple is continuous there are no cuts forming edges to interfere with a smooth engagement of its threads with the threads of the bolt, as there are in the case of certain locknuts heretofore known having surface-hardened segmental projections separated by radial cuts such as the Paige patent heretofore mentioned. Furthermore, the continuity of the nipple not only enables the nipple portion of the nut to retain the set or deformation which has been imparted to it by the washer far more strongly than if it were divided or cut, but as the metal of the nipple is forced into contact with the bolt forms a solid support or backing extending from the point of contact upwardly, so that the metal below that point is forced to flow molecularly by a compressive stress extending deeply into the metal adjacent the base of the nipple.

It has been found by accurate governmental tests made by the Bureau of Standards for the purpose of determining the comparative efficiency of various selected locking nuts, that with a three-quarter inch nut of the novel construction above described, given a torque 2910 inch pounds required to tighten it to a bolt stress of 20,000 pounds per square inch, a torque of 2450 inch pounds in the reverse direction was required to start to release the nut, and that after being started a gradually decreasing torque was required to unscrew the nut until the tension on the bolt was entirely released, at which point the torque became 900 inch pounds and so continued until the nut was entirely disengaged. A comparative test since made by me of a locking nut consisting of nut, washer and bolt members of the same size and material drawn up to the same bolt stress, but in which the nipple was cylindrical and the opening in the washer tapered, gave as a result, a torque of 1600 inch pounds to start release, and a torque gradually dropping to 300 inch pounds at a point where the bolt stress became zero. The efficiency of my novel locking nut, as indicated by the tests mentioned, is exceptionally high and is believed to be due to the uncut continuous formation of the nipple, and the conical inclination of its outer face, in connection with the use of a washer of the strength described having an opening of cylindrical form, and to the compressive action and resulting intimate contact of the threads of the relatively soft malleable nut with the threads of the harder bolt throughout the entire region of the nipple, as above described.

I claim:

1. In combination with a threaded bolt and a washer having a cylindrical opening, a lock nut of malleable material formed with a continuous tapered nipple upon one side, the diameter of said nipple across its outer face being approximately equal to the internal diameter of said washer.

2. In combination with a threaded bolt and a washer of ductile material having a cylindrical opening, a lock nut of relatively soft malleable material formed with a continuous tapered nipple upon one side, the diameter of said nipple across its outer face being approximately equal to the internal diameter of said washer, and the resistance of said washer to radial expansion being greater than the resistance of said nipple to compression.

3. In combination with a threaded steel bolt and a washer having a cylindrical opening, a malleable iron lock nut softer than the bolt formed with a continuous tapered nipple on one side, the diameter of said nipple adjacent its outer face being approximately equal to the internal diameter of said washer.

RALPH J. TEETOR.